UNITED STATES PATENT OFFICE 1,962,142

DYES AND DYEING

David Alexander Whyte Fairweather and John Thomas, Grangemouth, Scotland, assignors to Scottish Dyes, Limited, Grangemouth, Scotland No Drawing. Original application March 5, 1930, Serial No. 433,498. Divided and this application August 20, 1931, Serial No. 558,418. In Great Britain March 7, 1929

9 Claims. (Cl. 8—5)

This invention, which is a division from application No. 433,498 filed on March 5th, 1930, relates to the use of dyes or colouring matters.

The object of the invention is to provide new or improved applications in the art of dyeing and the like, for known or new substances, particularly sulphuric acid esters of vat dyestuffs.

As a result of researches we have found among other things that in the oxidation of 2-amino-anthra-hydroquinone-9:10-disulphuric acid ester in alkaline media, it is possible to obtain and isolate a body which appears to be the tetra sulphuric acid ester of tetrahydro indanthrone.

This is a very sensitive body which, in contact with acid is converted to a reddish-violet substance, and this reddish violet substance appears to be the known disulphuric acid ester of dihydro indanthrone.

We have also discovered that the tetra sulphuric ester can be used for dyeing textile fibres and the like, development or fixation being effected for instance by hydrolysis and oxidation on the fibre, for example, by acid solutions of ferric chloride, cupric chloride, or other known methods for the development or fixing or sulphuric acid esters of vat dyestuffs.

This tetra sulphuric ester appears to have an advantage over previously described esters of indanthrone, in that it has much greater solubility.

As the tetra-ester is so sensitive to acid it cannot readily be isolated by means of acid, but may conveniently be isolated by precipitating with potassium chloride or other suitable salt. It can also be isolated by evaporation of the alkaline solution. Alternatively it can be salted out or evaporated from neutral solution.

In addition to the ester of 2-amino-anthra-hydroquinone, substituted derivatives may be used, including those in which one of the hydrogen atoms of the amino group is replaced, but excluding those which have the substituent in the alpha position adjacent to the amino group.

The esters obtained from these substituted bodies appear to be tetra-esters, and we have found that they may be used in the same way as the tetra-ester obtained from the ester of amino-anthra-hydroquinone.

Further to the above, we have found that in the alkaline oxidation of the d sulphuric ester of the amino-anthra-hydroquinone of commercial purity it is possible to take the solution of the ester obtained after oxidation, and to separate it into one or more products. By this means we obtain an ester which is of high degree of purity, and has the advantage that it gives brilliant blue dyeings on the fibre; in fact, dyeings can be obtained equal in brightness to those obtained from specially purified dianthraquinone-1:2:2'1'-dihydroazine. The purification is preferably effected by a fractional crystallization, and we have found the potassium salts very suitable for this purpose.

By the methods of isolation from the yellow solutions obtained by alkaline oxidation of β-amino-anthra-hydro-quinone-9-10 - disulphuric acid ester or its substituted derivatives of solid yellow crystalline bodies, presumably sulphuric acid esters of dianthraquinonyl-1:2:1'-2'-dihydroazine or its derivatives, small quantities of impurities unavoidably remain in the product. The presence of these impurities is not greatly detrimental to the brightness of shade on cotton, but tends to produce dull shades on animal fibres. We have found that these impurities may be removed by means of a solvent such as methyl or ethyl alcohol in which the impurities are soluble but the required product is insoluble. This result is unexpected, as the by-products which are themselves presumably potassium salts of sulphuric acid esters, are some less soluble and some more soluble in water than the yellow ester itself.

The invention consists in the process which comprises the employment of a tetra-ester of tetra-hydro-indanthrone or of a substituted indanthrone, for example, the tetra-ester from 2-amino-anthra-hydroquinone-9:10-disulphuric acid ester or a substituted body of the aforesaid tetra-sulphuric acid ester in the parts of dyeing and the like.

The invention also consists in the process which comprises the application of products such as may be prepared as indicated above or by the equivalents of those processes especially when so prepared to the dyeing or colouration of textile fibres or the like for instance by hydrolysis and oxidation preferably in the presence of acid.

The invention also consists in dyed or otherwise coloured materials such as may be obtained by the use of products according to or prepared according to the processes indicated herein, or their equivalents, especially when so prepared.

The following examples illustrate how the invention may be carried into effect, Examples 1, 2, 3, 5, 6, 7, 8, 9, 10, 11, 13, 14, 15, 16, 17 and 20 being examples showing methods of preparation of vat dyestuff derivatives which may be utilized according to the present invention, and the remaining examples, namely Examples 4, 12, 18, 19, 21, 22 and 23 giving methods of utilizing the products for the purpose of the present invention, references to parts and to percentages being to parts and percentages by weight:—

Example 1

This deals with a method of preparing what appears to be the tetra sulphuric ester of tetra hydroindanthrone.

42.9 parts of sodium salt of β-amino-anthrahydroquinone disulphuric acid ester are dissolved in water together with 5 parts caustic soda, and a solution containing 7.4 parts sodium hypochlorite added slowly at 15° C. with stirring and cooling. The resulting solution contains what has been referred to above as the tetra sulphuric acid ester of tetra hydroindanthrone, also to be called the tetra sulphuric ester of tetra-hydrodianthraquinone-azine.

Example 2

A solution prepared as in Example 1 is evaporated until a concentrated solution is obtained and the solution saturated with potassium chloride.

The precipitate which forms is filtered off.

Example 3

Instead of isolating by the method of Example 2 the solution may be completely evaporated to dryness.

Evaporation can be carried out under ordinary pressure or preferably under vacuum or spray drier.

Example 4

According to this example, padding of cotton or the like is carried out by means of the solution obtained in Example 1, or in a solution made by redissolving the products of Examples 2 and 3 and then immersing the padded material in an acid oxidizing bath.

The strength of ester solution employed may be about one part of ester in about twenty parts of water, the material preferably being dried and then developed at 85° C. in a solution of 1 per cent. hydrochloric acid and 2 per cent. crystalline copper sulphate, 10 per cent. of salt being employed if desired.

Example 5

3,600 parts of liquor containing 429 parts of the sodium salt of β-amino-anthra-hydroquinone disulphuric acid ester and 72 parts of caustic soda are cooled to 0° and 950 parts of sodium hypochlorite liquor of 10 per cent. strength run in slowly with rapid stirring so that the temperature does not exceed 5° C. When the addition is complete the mixture is stirred for 15 minutes, and 10 parts of sodium sulphite are added to destroy any remaining hypochlorite. This solution may be used for dyeing purposes as in Example 4, or may be treated as in Example 3.

Example 6

Instead of adding sodium hypochlorite liquor as in the previous example, the hypochlorite may be formed in situ by passing into the liquor, to which has been added an additional 103 parts of caustic soda, 91 parts of chlorine at a temperature of 0.-5° C.

Example 7

This is an example of the use of a sulphuric ester of a substituted β-amino-anthraquinone.

464 parts of the sodium salt of 2-amino-3-chlor anthrahydroquinone disulphuric acid ester are used, and the treatment with hypochlorite carried out as in Examples 5 or 6.

The product (tetra sulphuric ester of 3:3'-dichlor-tetra-hydrodianthraquinone-azine) is a deep reddish-brown solution, which may be used for dyeing as in Example 4 or which may be evaporated as in Example 3.

Example 8

The solution obtained in Example 7 may be salted out by the addition of 40 to 50 per cent. of potassium carbonate and the paste obtained by filtration used for dyeing after dissolving in water.

Example 9

This describes the production of a solution of the yellow body.

46 parts of the potassium salt of β-aminoanthrahydroquinone disulphuric acid ester are dissolved in water together with 5 parts of caustic soda and then a solution containing 7.4 parts of sodium hypochlorite is slowly added at 15° C. with good stirring and cooling so that the temperature does not rise above the 15° C.

Example 10

This is an example of the separation of the pure material from the product obtained in Example 9.

The solution from this example is evaporated until its mass is reduced to about 600 parts (alternatively the amount of water used in Example 9 may be chosen so that no evaporation is necessary). When the mass of the solution is correct, sufficient potassium chloride is added until the solution contains about 75 parts of potassium. The liquor is cooled and filtered. The filtrate is then saturated with potassium chloride and allowed to stand for several hours when the yellow ester is precipitated in crystalline form and of high purity. These crystals are filtered off and sucked dry.

Example 11

This example describes a modified method of isolating the pure product.

After evaporating the solution, as already described in Example 10, this solution is saturated with potassium chloride while hot. After saturation it is filtered at a temperature of 70°–80°. By this means the by-products of less solubility remain behind. The filtrate is allowed to cool, when a thick brown precipitate separates, which is filtered off and sucked dry as before.

Example 12

This is an example of the production of a bright shade of blue on cotton from the pure product obtained as described above.

45 parts of the dry potassium salt are dissolved in 1000 parts of water. Cotton cloth well wetted out is then padded in this solution and dried. The padded cloth, orange in colour, is developed in a bath containing 2 per cent. of copper sulphate, 2 per cent. of concentrated hydrochloric acid and 10 per cent. of sodium chloride at a temperature of about 90°. Development takes place rapidly, and a brilliant blue dyeing results.

Example 13

The liquor obtained as in Example 5 is treated with 1000 parts of potassium chloride and filtered cold, the residue being washed with saturated potassium chloride solution. To the combined washings and filtrate is added a further 1000 parts of potassium chloride. The precipitate that separates on cooling is filtered off.

Example 14

This in an example of the further purification of the product obtained in Examples 2, 3 and 13. The dyestuff paste is dissolved in sufficient water to allow of complete solution at about 50° C. It is filtered from any foreign matter and reprecipitated by the addition of potassium chloride or potassium carbonate. The paste is washed on the filter with saturated potassium chloride.

Example 15

The yellow crystalline product obtained as in Examples 10 and 11 above is dried and extracted continuously with methyl alcohol until no further material is dissolved out. The residue is yellow in colour and consists of the starting material in a state of very high purity. The alcoholic liquor contains almost none of this product.

Example 16

A solution or suspension obtained as in Example 10 or 11 and containing, for instance, about 5 per cent. of it, is mixed with about an equal volume of ethyl alcohol and allowed to stand overnight. The impurities remain in solution and the required yellow ester is almost completely precipitated in crystalline form. It is filtered off and may be washed with alcohol, till the washings are colourless.

Example 17

Instead of drying the material before extraction as in the preceding example, the damp ester may be washed on the filter with alcohol or alternatively stirred to a paste with alcohol and filtered.

It should be noted that the processes of the above three examples are only designed to remove impurities which may dull the shade of dyeings and that inorganic salts may remain in the final product, these having no deleterious effect.

Example 18

This is an example of the production of a bright shade of blue on wool from the product obtained as described above. The dyebath is made by dissolving the quantity of the yellow ester salt necessary to give the required shade in water, the bath being 30-40 times the weight of the wool.

The wool, after wetting out is entered at 40° C. and the temperature is gradually raised to the boiling point. Exhaustion may be effected with acetic acid. The dyeing is developed in a bath containing 2 per cent. copper sulphate and 2 per cent. concentrated hydrochloric acid at about 90° C. Development is complete in a few minutes.

Example 19

This is a modification of the preceding example in which an amount of salt equal in weight to the wool is added to the dyebath. The wool is dyed a bright yellow and is developed as above.

Example 20

To the oxidized liquor obtained as in Example 7 is added 25 per cent. of its weight of potassium chloride. The matter is stirred for several hours in the cold and filtered, the cake being washed with a saturated solution of potassium chloride. To the combined filtrates and washings is now added 15 per cent. of sodium hydroxide, sodium carbonate, potassium hydroxide or potassium carbonate, and the liquid allowed to stand 12 hours at ordinary temperature. It is then filtered and the cake is lifted and is stirred at 60° C. with 650 parts of ethyl alcohol for one hour.

On cooling, what is presumably the tetra ester of dichlor tetra hydro indanthrone crystallizes out in pure form. It is filtered off and washed on the filter with cold ethyl alcohol until the runnings are nearly colourless.

Example 21

A padding bath is made up from 54 parts of water, 54 parts of 30 per cent. sodium chloride solution and 10 parts of a 12 per cent. paste of the very pure tetra ester of indanthrone obtained by the methods of Examples 15, 16 or 17. The cotton is then padded in this, squeezed and dried in warm air. It is then developed in a bath containing 2 per cent. of copper sulphate crystals and 1 per cent. concentrated hydrochloric acid for 4 minutes at 87° C. and soaped at the boil.

Example 22

Scoured woolen cloth of dry weight equivalent to 13 parts is thoroughly wetted out and entered at 40 C. into a bath made by dissolving 2.75 parts of a 16 per cent. paste of the pure potassium salt of the tetra sulphuric ester of dichlor indanthrone. The temperature is raised to 90-95° C. while working the wool and a 5 per cent. solution of acetic acid is then slowly added and the material worked until the dyestuff is all absorbed and the bath becomes colourless.

The dyeing is then transferred to a bath containing 2 per cent. of cupric sulphate crystals and 2 per cent. of concentrated hydrochloric acid at 87° C. and developed at this temperature for a few minutes.

Example 23

20 parts of dark British gum powder and 10 parts of glycerine are boiled up with 70 parts of water and then cooled and 5 parts of a 20 per cent. paste of the ester are stirred in.

After printing the goods are steamed and developed.

General

The invention is not limited to the examples given above, nor is it confined to the use of esters of indanthrone, but may be applied in connection with other vat dyestuffs. The chemically equivalent quantity of the potassium salt of β-amino-anthra-hydroquinone disulphuric acid ester may be used in Example 1 in place of the sodium salt referred to therein, and the resulting product employed instead of the product of Example 1.

Where reference has been made to dyeing, this includes printing, padding, pigmenting or otherwise colouring.

Some of the products obtained by the process of separation referred to above do not give a blue vat dyestuff under the conditions described. That residue which crystallizes out first does so in the form of brownish crystals. The filtrate remaining after separating the pure body is also brown in colour, and contains material of high solubility.

Having now described our invention, what we claim as new and desire to secure by Letters Patent is:—

1. The process which consists in the application for dyeing purposes of bodies selected from the group consisting tetra-sulphuric esters of
    (a) tetra-hydro-indanthrone
    (b) substituted tetra-hydro-indanthrones.

2. A process for the colouration of textile materials and fibres which consists in the application to the material to be coloured of a tetra-sulphuric ester of a tetra hydro-dianthraquinone-azine in which the ester groups are in 9:10 positions followed by development of the colour.

3. A process for the colouration of textile materials and fibres which consists in the application to the material to be coloured of a tetra-sulphuric ester of a tetra-hydro-dianthraquinone-azine in which the ester groups are in 9:10 positions followed by treatment of the material with an acid.

4. A process for the colouration of textile materials and fibres which consists in the application to the material to be coloured of a tetra-sulphuric ester of a tetra-hydro-dianthraquinone-azine in which the ester groups are in 9:10 positions followed by treatment of the material with an acid in the presence of a copper salt.

5. A process for the colouration of textile materials and fibres which consists in the application to the material to be coloured of the tetra-sulphuric ester of 3:3'-dichloro-tetra-hydro-dianthraquinone-azine in which the ester groups are in 9:10 positions followed by development of the colour.

6. A process as claimed in claim 3, in which cotton is the textile material and fibre to be coloured.

7. A process as claimed in claim 3, in which wool is the textile material and fibre to be coloured.

8. A process as claimed in claim 4, in which cotton is the textile material and fibre to be coloured.

9. A process as claimed in claim 4, in which wool is the textile material and fibre to be coloured.

DAVID ALEXANDER WHYTE FAIRWEATHER.
JOHN THOMAS.